United States Patent [19]

Rottler

[11] Patent Number: 4,557,640

[45] Date of Patent: Dec. 10, 1985

[54] COMBINATION BORING AND HONING APPARATUS AND METHOD

[76] Inventor: Donald B. Rottler, 2423 8th Ave. N., Seattle, Wash. 98109

[21] Appl. No.: 885,651

[22] Filed: Mar. 13, 1978

[51] Int. Cl.⁴ .................. B23B 41/12; B24B 33/02
[52] U.S. Cl. .................... 408/27; 29/26 A; 51/34 H; 408/88; 408/98; 408/709
[58] Field of Search ............. 29/26 R, 26 A, 26 B; 408/27, 88, 237, 48, 709, 95; 51/34 H

[56] References Cited

U.S. PATENT DOCUMENTS 2,486,813 11/1949 Yount ........................ 408/709 X
3,245,289 4/1966 Nelson ........................... 408/98
3,273,423 9/1966 Rottler ........................ 408/98 X

FOREIGN PATENT DOCUMENTS 384937 12/1932 United Kingdom ............. 29/26 R

Primary Examiner—Z. R. Bilinsky
Attorney, Agent, or Firm—Seed and Berry

[57] ABSTRACT

A boring unit and a honing unit are concurrently carried on the bed of a boring machine for performing boring and honing operations on the cylinder bores of an engine block. A unique clamping technique is employed to clamp the engine block to the bed of the boring machine while the honing device is operating on the furthest most cylinder bore and adjacent the boring unit.

6 Claims, 7 Drawing Figures

COMBINATION BORING AND HONING APPARATUS AND METHOD

BACKGROUND OF THE INVENTION

1. Field of the Invention

This invention pertains to an improved boring machine and method particularly adapted for the boring of engine cylinders and is of the type in which the engine block is clamped on a stationary bed and the boring unit and honing unit are moved on the bed to boring and honing positions at each bore and then clamping the engine block to the bed.

2. Description of the Prior Art

Boring machines of the type used to rebore the cylinder bores of engine blocks are known as shown in U.S. Pat. Nos. 3,260,136 and 3,273,423. The cylinder bores after being rebored must then be honed to put a desired honed cutting pattern in the wall of the cylinder bores so that oil and compression rings on the piston will seat better. Heretofore, the honing has occurred at a completely separate location from the boring machine on honing machines such as shown in U.S. Pat. No. 3,393,472 and British Pat. No. 1,200,085. Moving the engine block from one machine to another is time consuming because the block has to be accurately positioned on both machines, requires considerable labor costs and utilized two large pieces of equipment.

SUMMARY OF THE INVENTION

It is an object of this invention to provide an apparatus for boring and honing on the same bed.

It is another object of this invention to provide a method for boring and honing an engine block while it remains stationary in one position.

It is still another object of this invention to provide a unique clamping device for clamping the engine block to the bed of an apparatus which concurrently carries a boring unit and a honing unit.

Basically, these objects are obtained by providing a boring machine having a bed upon which an engine block can be accurately positioned and on the same machine providing also a honing unit which can move along the engine block in the same manner as the boring unit. Uniquely, the engine block can be held against movement by clamping means which holds the engine block against the bed regardless of whether the boring unit or honing unit is in place at any one of the cylinder bores. The clamping means includes at least one clamp which is carried by the movable honing unit. The clamp so carried is swingable to either side of the honing unit upon which it is carried to allow it to be positioned to hold the engine block regardless of the end of the engine block at which the honing unit is operating. That is, the clamping member can be swung inwardly of the engine block relative to the location of the honing unit along the engine block at that particular position. Thus, if the honing unit is off the engine block to the left the clamping member carried thereby can be swung in the opposite direction to maintain a grip on the engine block while the boring unit is in operation. However, when the honing unit is at the extreme opposite end of the engine block operating on the furthest most cylinder bore at the right end of the engine block the clamp is swung to the opposite side or in-board end of the engine block again to maintain a hold on the engine block during honing. Under normal practices, the honing operation involves is much lighter weight cutting and provides less vibration and need of a gripping hold on the engine block to maintain its position on the bed. Thus when honing, only one of the clamping members need be used for doing the last remaining cylinder bores on the engine block.

The method of the invention comprises the steps of boring and then honing on an engine block which remains stationary in one position. In the preferred embodiment, the engine can be clamped by carrying a clamping member on the honing unit and swung into place.

The advantages of the apparatus and method are apparent. Once the engine block is initially accurately positioned on the bed of the boring machine, it need not be transported to a new location for the honing operation. By incorporating a honing unit directly on the bed of the boring machine, substantial cost savings in overall materials, labor and machine controls are saved.

DETAILED DESCRIPTION OF THE PREFERRED EMBODIMENTS

Figure 1:
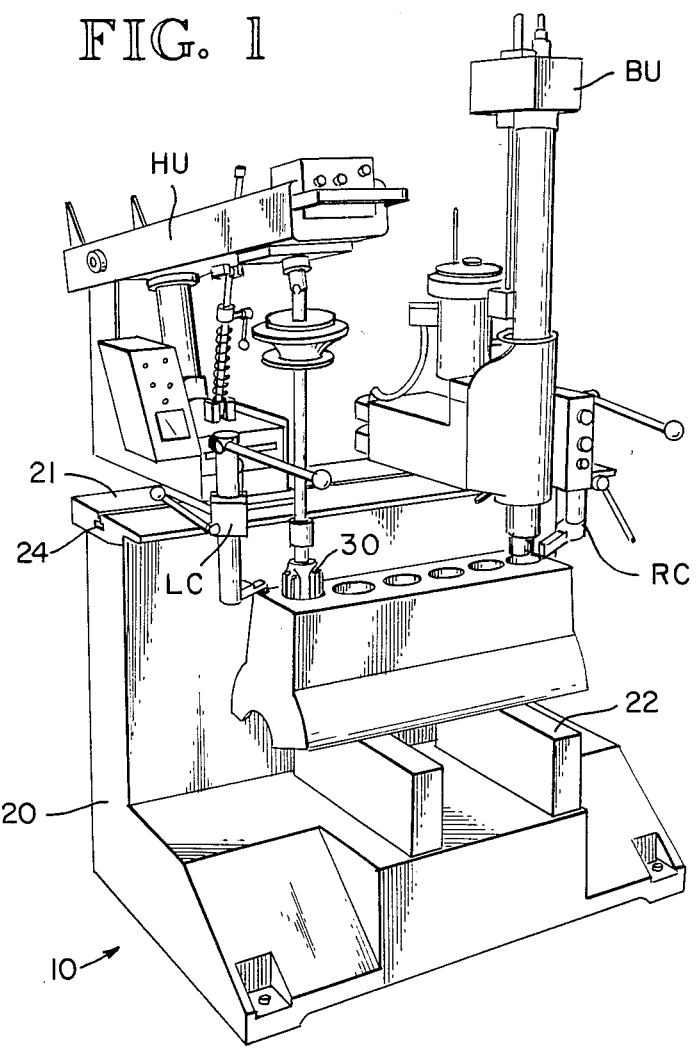
FIG. 1 is a perspective of a boring and honing machine embodying the principles of the invention.

As best shown in FIG. 1 the combined boring and honing machine 10 includes a stationary bed 20 having an upper planar slide surface 21 which is laterally offset from a table having a pair of wear pads 22 for receiving an engine block and a fixture (not shown). The upper slide surface 21 has a longitudinal slideway or keyway 24 of an inverted T cross-section for receiving anchoring keys 27 for a honing unit HU, a boring unit BU and a first clamp or right clamp RC. As will be seen, an anchoring unit also serves to anchor in conjunction with the honing unit a left clamp LC. As thus far described, the apparatus is essentially identical to that shown in my earlier U.S. Pat. No. 3,273,423 with the exception that the honing unit and left clamp are added to what was previously in the patent a boring machine only. Details of construction, however, of the boring unit and the bed are found in said earlier patent and the details are incorporated herein by reference thereto.

Figure 2:
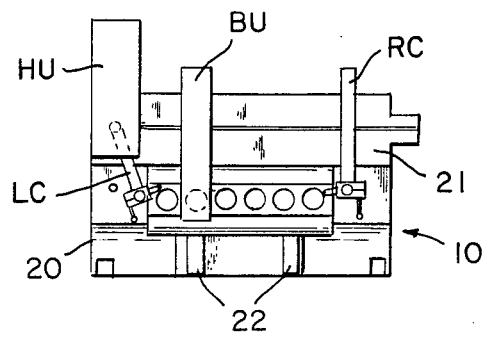
FIG. 2 is a schematic plan illustrating a boring operation and the position of clamps for holding the engine block on the bed of the machine.
Figure 3:
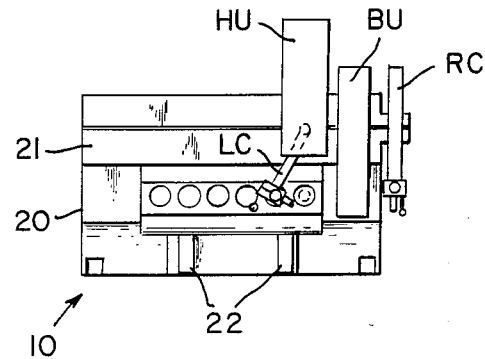
FIG. 3 is a schematic plan illustrating a honing operation with a single clamp carried by the honing unit holding the engine block to the bed of the boring and honing machine.

The honing unit is of a conventional type having a vertically downwardly depending driven hone or cutter 30 of the type shown in British Pat. No. 1,200,085. The details of construction of the honing unit are found in such British patent and in U.S. Pat. No. 3,393,472 and these details are incorporated herein by reference to those patents. For the purpose of the description of this invention it need only be understood that the boring unit can move longitudinally on the slideway from the position beyond the right end of the engine block as shown in FIG. 3 to a position to the extreme left end of the engine block as shown approaching this position in FIG. 2. Similarly, the honing unit can be moved from the position beyond the left end of the engine block as shown in FIG. 2 to a position aligned over the furthermost right cylinder bore as shown in FIG. 3.

It is a unique feature of this invention also that the engine block can be clamped against vibration and movement caused during the honing operation regardless of the fact that the boring unit when off the engine block to the right precludes the use of the right clamp RC for holding the engine block. For this purpose the left clamp LC is not mounted independently of the honing or boring units but rather is embodied or incorporated directly into the honing unit, moves therewith and, importantly, can be swung to either side of the cutting tool 30 depending upon the location of the honing unit on the engine block. Thus, as in FIG. 2, boring which requires considerably more clamping force can occur with both clamps LC and RC holding the engine block. By swinging the left clamp LC to the side of the honing cutter remote from the boring unit, the cutter still can maintain a lesser but sufficient clamping pressure on the engine block during the subsequent lighter loaded honing operation.

Figure 4:
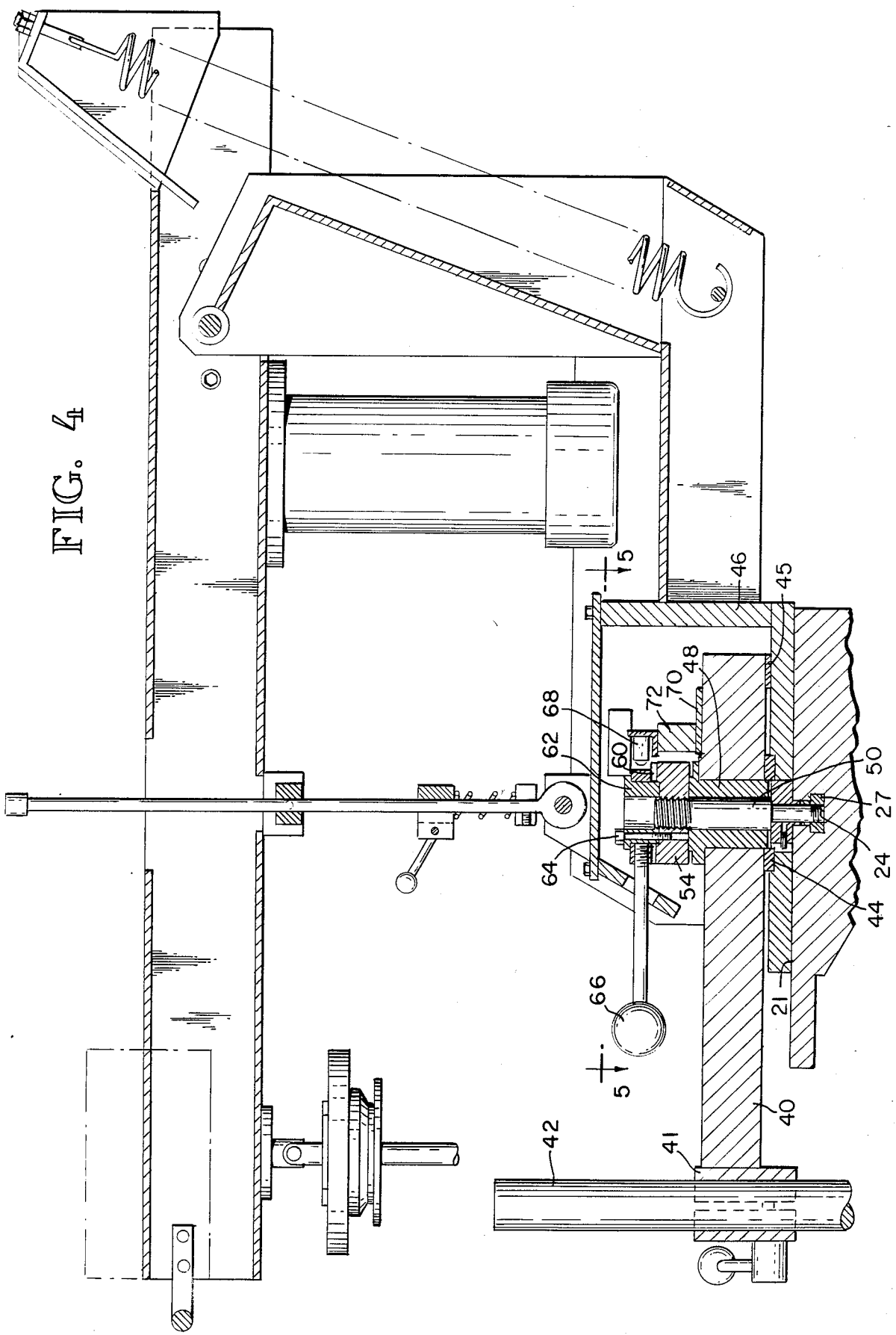
FIG. 4 is an enlarged vertical fragmentary section.
Figure 5:
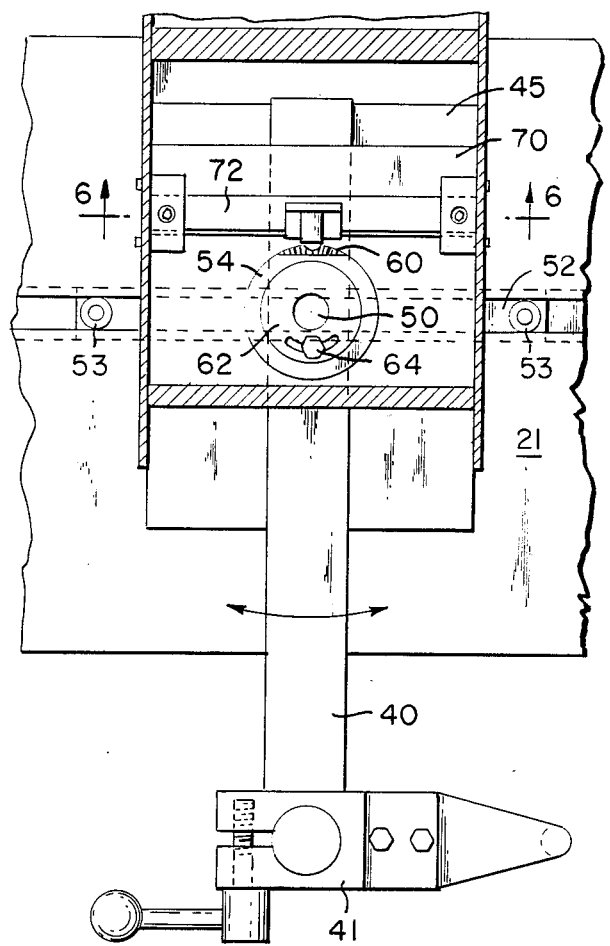
FIG. 5 is a fragmentary plan of a clamping member carried by the honing unit of the machine, taken along the line 5—5 of FIG. 4.
Figure 6:
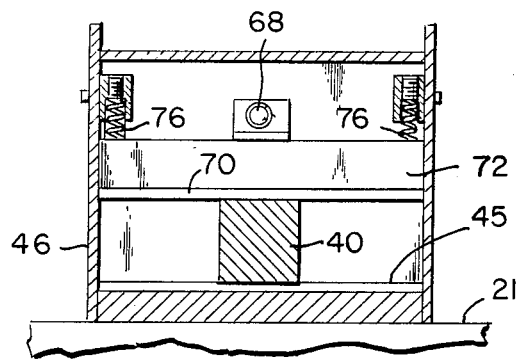
FIG. 6 is a fragmentary vertical detail taken along the line 6—6 of FIG. 5.

The unique lefthand clamping member LC is best shown in FIGS. 4, 5 and 6 and includes a horizontal bar 40 having at its distal end a clampable sleeve 41 which holds a vertically and rotatably adjustable finger 42. The horizontal bar rests for rotation on pads 44 and 45 which rest on a box frame 46 that is carried on the slide surface 21. As is described in my earlier U.S. Pat. No. 3,273,423 this slide surface is air cushioned by a layer of air between the box frame 46 and the slide surface 21. The bar rotates on a sleeve 48 which surrounds a post 50 having a lower end threaded into a elongated inverted T-shaped anchor 27 which is received in the inverted T-shaped slideway 24. The upper end of the post is threaded into a nut 54. The nut is broken into two pieces having an upper separable piece 56 having a flat 57. The two pieces of the nut are both toothed for meshing engagement as at 60 with a cap 62 holding the two pieces together via a cap screw 64. Rotation of the nut occurs through a handle 66. When rotation occurs the nut threads the post upwardly pulling the anchor 27 tightly against the upper surface of the slideway 24 to lock the arm 40 as well as the honing unit tightly to the slide surface 21 of the table. The flat upon rotation of the nut also engages a switch 68 which deenergizes the air cushion supply so that the honing unit more firmly seats on the slide surface 21.

The bar 40 takes considerable abuse and rough handling so as to protect against racking of the post 50 and bar. The bar is provided with a wear plate 70 that is engaged by a hold-down bar 72. The hold-down bar 72 is engaged by a pair of springs 76 that are connected to the box frame 46. In this way, a light loading is maintained between the member 72 and the wear plate 40 to prevent racking.

The method is best understood by referring to FIGS. 2 and 3 of the drawings. Boring and honing can in some instances occur in some of the cylinder bores adjacent to one another simultaneously and will be especially useful for this purpose with completely automated positioning of the honing and boring units. In the preferred method, however, the boring unit is first moved through the various cylinder bores while the right hand and left hand clamps are holding the engine block with the left hand clamp being swung to the right of the honing unit as shown in FIG. 2. When boring has been completed the boring unit is slid off the engine block to the right as shown in FIG. 3 along with the right hand clamp. If desired, the right hand clamp and boring unit can be left over the engine block so that the right hand clamp can be used to clamp the engine block while cylinder ports to the left thereof can be honed by the honing unit. When the honing unit reaches the furthermost cylinder bore, however, the boring unit must be moved beyond the engine block and the left hand clamp swung to the left to maintain a clamping engagement with the engine block during honing.

Figure 7:
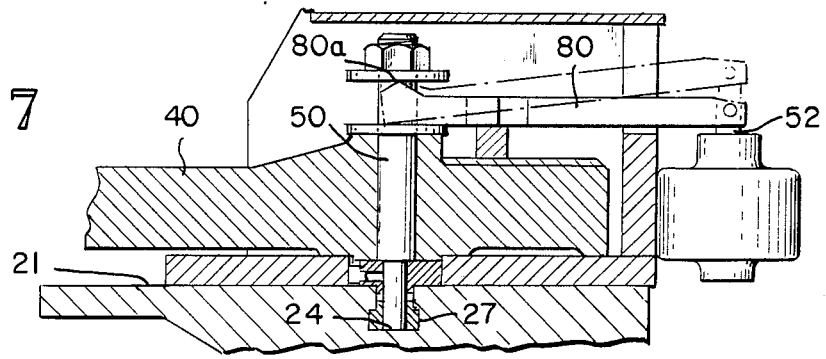
FIG. 7 is a fragmentary vertical section of a modified clamp.

FIG. 7 illustrates a modification in which the post 50 is raised by an air actuator to lock the bar 40. For this purpose the nut 54 and handle 66 is replaced by a forked rocker cam 80. The rocker cam straddles the post 50 and rests on the bar 40. An air cylinder has its piston rod 82 pivotally connected to the rocker cam and when extended raises the rocker cam causing a cam surface 80a to raise the post thus locking the anchor 27 against the inverted T-shaped slot.

While the preferred embodiments of the invention have been illustrated and described, it should be understood that variations will be apparent to one skilled in the art without departing from the principles expressed herein. Accordingly, the invention is not to be limited to the embodiment illustrated in the drawing.

I claim:
1. In combination,
   an elongated rigid bed having a lower support area for an engine block and an upper slideway laterally offset relative to the support area, said slideway having a central area opposite the support area and having end areas at its opposite ends located endwise beyond the support area,
   a first engine block clamping unit, a cylinder boring unit, and a cylinder honing unit mounted to move independently along said slideway and arranged in the recited order, said first clamping unit and boring unit being adapted to occupy the other of said end areas whereby all of the cylinders of an engine block in the support area can be successively bored and honed,
   a second engine block clamping unit on the honing unit,
   said first clamping unit being swingable from said one end area into engine block clamping position without interfering with operation of the boring unit when the boring unit is in the central area, and being movable out of reach of the engine block when the boring unit is moved into said one end area after boring of the adjoining cylinder bore to make room for the honing unit to occupy a position for honing said adjoining bore,
   said second clamping unit being swingable from side to side of the honing unit into engine block clamping position such that an engine block can be clamped by the second clamping unit on the boring unit side of the honing unit when the honing unit is in said other end area to make room for the boring unit to operate on the adjacent cylinder bore, and can be clamped by the second clamping unit at a location in the central area together with the honing unit or alone when the honing unit occupies said one end area, whereby both of said clamping units can be in engine block clamping position at opposite sides of the boring unit whenever the boring unit is operating alone in the central area or when both the boring unit and the honing unit are operating in the central area, and whereby the second clamping unit can always be in engine clamping position adjacent the bore being honed whenever the honing unit is operating in the central area.

2. A combination according to claim 1 in which said slideway has a keyway therealong, said first and second clamping unit having respective anchoring means for anchoring them to the keyway when in clamping position, and said anchoring means of the second clamping unit also being adapted to anchor the honing unit on the slideway when in engine block clamping position.

3. In combination, an elongated rigid bed having a lower support area for an engine block and an upper slideway laterally offset relative to the support area and formed with a longitudinal keyway, said slideway having a central area opposite the support area and having end areas at its opposite ends located endwise beyond the support area, a first engine block clamping unit, a cylinder boring unit, and a cylinder honing unit mounted to move independently along said slideway in side-by-side relation in the recited order, said first clamping unit and boring unit being adapted to occupy one of said end areas and said honing unit being adapted to occupy the other of said end areas whereby all of the cylinders of an engine block in the support area can be successively bored and honed, a second engine block clamping unit on the honing unit, said first clamping unit being swingable from said one end area into engine block clamping position when the boring unit is in the central area, said second clamping unit being swingable from side to side into engine block clamping position such that an engine block can be clamped by the second clamping unit when the honing unit is in said other end area or in the central area, whereby both of said clamping units can be in engine block clamping position at opposite ends of the block whenever the boring unit is operating in the central area or when both the boring unit and the honing unit are operating in the central area, and whereby the second clamping unit can always be in engine clamping position whenever the honing unit is operatin in the central area, said first and second clamping units being anchored to the keyway when in clamping position, and said second clamping unit also clamping the honing unit against the slideway when in engine block clamping position, said honing unit having a base with an opening therethrough overlying said keyway, and said second clamping unit including post means extending through said opening into said keyway and interfitting therewith, a swing bar swing-mounted on said post means and arranged to reach over said support area, and locking means for selectively urging said post means upwardly and said swing bar downwardly against said base of the honing unit to thereby simultaneously lock the honing unit relative to said slideway and said swing bar relative to the honing unit.

4. A combination according to claim 3 in which said locking means includes a rocker cam operating between an enlarged head on the post means and the top of said swing arm, and pressure means for selectively rocking said rocker cam.

5. A cylinder finishing and clamping assembly comprising a housing having a base for resting on a slideway and presenting a forwardly opening cavity, said base having a bottom opening to overlie a keyway in the slideway, cylinder finishing means mounted on said housing and adapted to reach forwardly therefrom, post means in said cavity and depending through said bottom opening, said post means having locking means at its lower end for interfitting with the keyway and locking said base against the slideway responsive to upward axial pressure on the post means, work clamping means having a swing bar projecting forwardly from said cavity and swing-mounted on said post means, and locking means for selectively forcing said post means upwardly and the swing bar downwardly against said base to hereby simultaneously lock said housing relative to said slideway and said swing bar relative to said housing.

6. A cylinder finishing and clamping assembly according to claim 5 in which said post means has an enlarged head space above said swing bar, and said locking means comprises a rocker cam extending between said enlarged head and swing bar, and pressure means for selectively rocking said rocker cam.

* * * * *

UNITED STATES PATENT OFFICE
CERTIFICATE OF CORRECTION

Patent No. 4,557,640              Dated   December 10, 1985

Inventor(s)  Donald Rottler

It is certified that error appears in the above-identified patent and that said Letters Patent are hereby corrected as shown below:

Column 6,  Claim 3, line 2 change "operatin" to --operating--;

Claim 5, line 43 change "hereby" to --thereby--;

Claim 6, line 48 change "space" to --spaced--.

Signed and Sealed this

Sixth Day of May 1986

[SEAL]

Attest:

DONALD J. QUIGG

Attesting Officer           Commissioner of Patents and Trademarks